United States Patent
Zielinski et al.

(10) Patent No.: US 8,774,204 B2
(45) Date of Patent: Jul. 8, 2014

(54) HANDHELD FIELD MAINTENANCE BUS MONITOR

(75) Inventors: Stephen A. Zielinski, Savage, MN (US); Thomas M. Bell, Lakeville, MN (US); Anthony D. Ferguson, Watertown, MN (US); Brian A. Franchuk, Richfield, MN (US)

(73) Assignee: Fisher-Rosemount Systems, Inc., Round Rock, TX (US)

( * ) Notice: Subject to any disclaimer, the term of this patent is extended or adjusted under 35 U.S.C. 154(b) by 1602 days.

(21) Appl. No.: 11/526,560

(22) Filed: Sep. 25, 2006

(65) Prior Publication Data

US 2008/0075012 A1 Mar. 27, 2008

(51) Int. Cl.
*H04L 12/28* (2006.01)
*H04L 12/42* (2006.01)

(52) U.S. Cl.
CPC ..................... *H04L 12/42* (2013.01)
USPC ........................................................ 370/419

(58) Field of Classification Search
CPC .................................................... H04L 12/42
USPC .............. 370/241, 250, 419; 455/41.2, 67.14, 455/407, 409, 423
See application file for complete search history.

(56) References Cited

U.S. PATENT DOCUMENTS

| | | | |
|---|---|---|---|
| 4,337,516 A | 6/1982 | Murphy et al. | 364/551 |
| 4,517,468 A | 5/1985 | Kemper et al. | 290/52 |
| 4,540,890 A | 9/1985 | Gangemi et al. | 307/40 |
| 4,635,214 A | 1/1987 | Kasai et al. | 364/551 |
| 4,642,782 A | 2/1987 | Kemper et al. | 364/550 |
| 4,924,418 A | 5/1990 | Backman et al. | 364/550 |
| 5,005,142 A | 4/1991 | Lipchak et al. | 364/550 |
| 5,067,099 A | 11/1991 | McCown et al. | 364/550 |
| 5,099,436 A | 3/1992 | McCown et al. | 364/550 |
| 5,122,948 A | 6/1992 | Zapolin | 364/131 |
| 5,274,572 A | 12/1993 | O'Neill et al. | 364/550 |
| 5,305,230 A | 4/1994 | Matsumoto et al. | 364/495 |
| 5,442,639 A | 8/1995 | Crowder et al. | 371/20.1 |
| 5,481,200 A | 1/1996 | Voegele et al. | 324/718 |
| 5,754,596 A | 5/1998 | Bischoff et al. | 375/295 |

(Continued)

FOREIGN PATENT DOCUMENTS

| | | |
|---|---|---|
| GB | 2 394 124 | 4/2004 |
| JP | 7244625 | 9/1995 |

(Continued)

OTHER PUBLICATIONS

Technical Data Sheet: VIATOR® USB HART® Interface (Model 010031). MACTek Measurement and Control Technologies.

(Continued)

*Primary Examiner* — Dang Ton
*Assistant Examiner* — Nourali Mansoury
(74) *Attorney, Agent, or Firm* — Christopher R. Christenson; Kelly, Holt & Christenson, P.L.L.C.

(57) ABSTRACT

A handheld field maintenance bus monitor is provided. The handheld field maintenance bus monitor is coupleable to at least one process communication loop, and is configured to capture and store a selected quantity of digital communication observed on the process communication loop during a capture period. Optionally, the handheld field maintenance bus monitor may be configured to couple to and interact with process communication loops of at least two different process communication protocols, such as HART® and FOUNDA-TION™. A method of analyzing captured and stored communication data is also provided.

16 Claims, 5 Drawing Sheets

(56) References Cited

U.S. PATENT DOCUMENTS

| | | | |
|---|---|---|---|
| 5,764,891 A | 6/1998 | Warrior | 395/200.2 |
| 5,805,442 A | 9/1998 | Crater et al. | 364/138 |
| 5,850,523 A | 12/1998 | Gretta, Jr. | 395/200.54 |
| 5,923,557 A | 7/1999 | Eidson | 364/471.03 |
| 5,970,430 A | 10/1999 | Burns et al. | 702/122 |
| 6,017,143 A | 1/2000 | Eryurek et al. | 700/51 |
| 6,026,352 A | 2/2000 | Burns et al. | 702/182 |
| 6,061,603 A | 5/2000 | Papadopoulos et al. | 700/83 |
| 6,094,600 A | 7/2000 | Sharpe, Jr. et al. | 700/19 |
| 6,119,047 A | 9/2000 | Eryurek et al. | 700/28 |
| 6,157,929 A * | 12/2000 | Zamiska et al. | 1/1 |
| 6,192,281 B1 | 2/2001 | Brown et al. | 700/2 |
| 6,211,649 B1 | 4/2001 | Matsuda | 320/115 |
| 6,285,966 B1 | 9/2001 | Brown et al. | 702/188 |
| 6,298,377 B1 | 10/2001 | Hartikainen et al. | 709/223 |
| 6,317,701 B1 | 11/2001 | Pyostsia et al. | 702/188 |
| 6,370,448 B1 | 4/2002 | Eryurek et al. | 700/282 |
| 6,377,859 B1 | 4/2002 | Brown et al. | 700/79 |
| 6,397,114 B1 | 5/2002 | Eryurek et al. | 700/51 |
| 6,405,099 B1 | 6/2002 | Nagai et al. | 700/159 |
| 6,487,462 B1 | 11/2002 | Reeves | 700/73 |
| 6,564,268 B1 | 5/2003 | Davis et al. | 710/11 |
| 6,611,724 B1 | 8/2003 | Buda et al. | 700/49 |
| 6,629,059 B2 | 9/2003 | Borgeson et al. | 702/183 |
| 6,859,755 B2 | 2/2005 | Eryurek et al. | 702/183 |
| 6,889,166 B2 | 5/2005 | Zielinski et al. | 702/183 |
| 7,117,122 B2 | 10/2006 | Zielinski et al. | 702/183 |
| 7,421,531 B2 | 9/2008 | Rotvold et al. | 710/305 |
| 2003/0204373 A1* | 10/2003 | Zielinski et al. | 702/184 |
| 2003/0229472 A1* | 12/2003 | Kantzes et al. | 702/183 |
| 2004/0111238 A1 | 6/2004 | Kantzes et al. | 702/183 |
| 2004/0228184 A1 | 11/2004 | Mathiowetz | 365/202 |
| 2004/0230327 A1 | 11/2004 | Opheim et al. | 700/83 |
| 2004/0249583 A1 | 12/2004 | Eryurek et al. | 702/47 |
| 2006/0048025 A1 | 3/2006 | Filipovic | 714/724 |
| 2006/0075009 A1 | 4/2006 | Lenz et al. | 708/160 |
| 2006/0155908 A1 | 7/2006 | Rotvold et al. | 710/315 |
| 2006/0161393 A1 | 7/2006 | Zielinski et al. | 702/184 |
| 2006/0291438 A1 | 12/2006 | Karschnia et al. | 370/338 |
| 2008/0114911 A1 | 5/2008 | Schumacher | 710/72 |

FOREIGN PATENT DOCUMENTS

| | | |
|---|---|---|
| RU | 94033147 | 2/1998 |
| WO | WO 2009/003146 | 12/2008 |
| WO | WO 2009/003148 | 12/2008 |

OTHER PUBLICATIONS

VIATOR® Bluetooth,® Wireless Technology Interface for use with HART field devices. MACTek Measurement and Control Technologies retrieved from www.mactekcorp.com/product5.htm.

Product Data Sheet: VIATOR RS232. MACTek Measurement and Control Technologies retrieved from www.mactekcorp.com/product1.htm.

Second Office Action for related Chinese patent application No. 200780035552.4 dated Jun. 22, 2011.

International Search Report and Written Opinion of European Patent Office for related Application No. PCT/US2007/020372 filed Sep. 20, 2007.

"Foundation Fieldbus Host Interfaces," National Instruments, "NI AT-FBUS Series, NI PCI-FBUS/2, NI PCMCIA-FBUS Series," prior to Jun. 2007, pp. 753-754.

"Data Capture, The Source of Information," Gemba Solutions, The Stables, Wolvey Lodge Business Centre, Wolvey, Leicestershire, LE10 3HB, prior to Jun. 2007, 2 pages.

"Product Specification, Foundation Fieldbus, FBT-3," Relcom Inc., prior to Jun. 2007, p. 1 of 1.

"FB View, Fieldbus Network Analyzer," SMAR International, Copyright 2001-2005, 1 page.

"SMV 3000 Smart Multivariable Transmitter: The Four-in-One Transmitter and Flow Computer," by Honeywell Inc., Nov. 1995, 6 pages.

Further Communication from the corresponding European patent application No. 07838559.8 dated Aug. 12, 2011.

Official Action for Russian patent application No. 2009115645 dated Nov. 17, 2010.

Communication from European Patent Office dated Mar. 23, 2010 for European application No. 07 83 8559.8.

Official Action for Russian patent application No. 2009115645 dated Mar. 23, 2011.

First Office Action for Japanese patent application No. 2009530374 dated Jun. 14, 2011.

Communication for Russian patent application No. 2009115645 dated Jul. 13, 2010.

First Office Action for Chinese patent application No. 200780035552.4 dated Aug. 4, 2010.

Third Office Action from the corresponding Chinese patent application No. 200780035552.4 dated Mar. 12, 2012.

* cited by examiner

HANDHELD FIELD MAINTENANCE BUS MONITOR

BACKGROUND

Intrinsically safe handheld field maintenance tools are known. Such tools are highly useful in the process control and measurement industry to allow operators to conveniently communicate with and/or interrogate field devices in a given process installation. Examples of such process installations include petroleum, pharmaceutical, chemical, pulp and other processing installations. In such installations, the process control and measurement network may include tens or even hundreds of various field devices which periodically require maintenance to ensure that such devices are functioning properly and/or calibrated. Moreover, when one or more errors in the process control and measurement installation is detected, the use of an intrinsically safe hand held field maintenance tool allows technicians to quickly diagnose such errors in the field.

One such device is sold under the trade designation Model 375 Field Communicator available from Fisher-Rosemount Systems, Inc., of Austin, Tex. The Model 375 is an intrinsically safe handheld field maintenance tool that supports communication with field devices of at least two different process communication protocols. In particular, the Model 375 is designed to support HART® and FOUNDATION™ fieldbus devices from many vendors. Moreover, the Model 375 can be used to perform diagnostics for effective startup and trouble shooting of Foundation™ Fieldbus segments. The Model 375 can allow a technician to create a quality segment by diagnosing the network DC voltage and average noise. Moreover, power supply problems can be detected by monitoring low frequency noise on a segment and incorrect terminations and faulty devices can be diagnosed by observing the communications signal level.

In situations where a faulty device is communicating with an appropriate communication signal level, but the communications themselves are erroneous, the diagnostics of prior art handheld field maintenance tools may not suffice. In such cases, relatively larger, and potentially non-intrinsically safe devices such as computers with suitable hardware adaptations are used to essentially capture communication on the process loop in order to allow a technician to diagnose the communication errors. Typically, such computers or control system are located away from the field devices in a control room. Accordingly, if a change is made to a field device in the field, in order to address a communication error, the technician must return to the control room in order to invoke, or otherwise engage, bus monitor functionality in the control system to observe communication of the affected field device.

SUMMARY

A handheld field maintenance bus monitor is provided. The handheld field maintenance bus monitor is coupleable to at least one process communication loop and is configured to capture and store a selected quantity of digital communication observed on the process communication loop during a capture period. Optionally, the handheld field maintenance bus monitor may be configured to couple to and interact with process communication loops of at least two different process communication protocols, such as HART® and FOUNDATION™. A method of analyzing captured and stored communication data is also provided.

DETAILED DESCRIPTION OF ILLUSTRATIVE EMBODIMENTS

Figure 1:
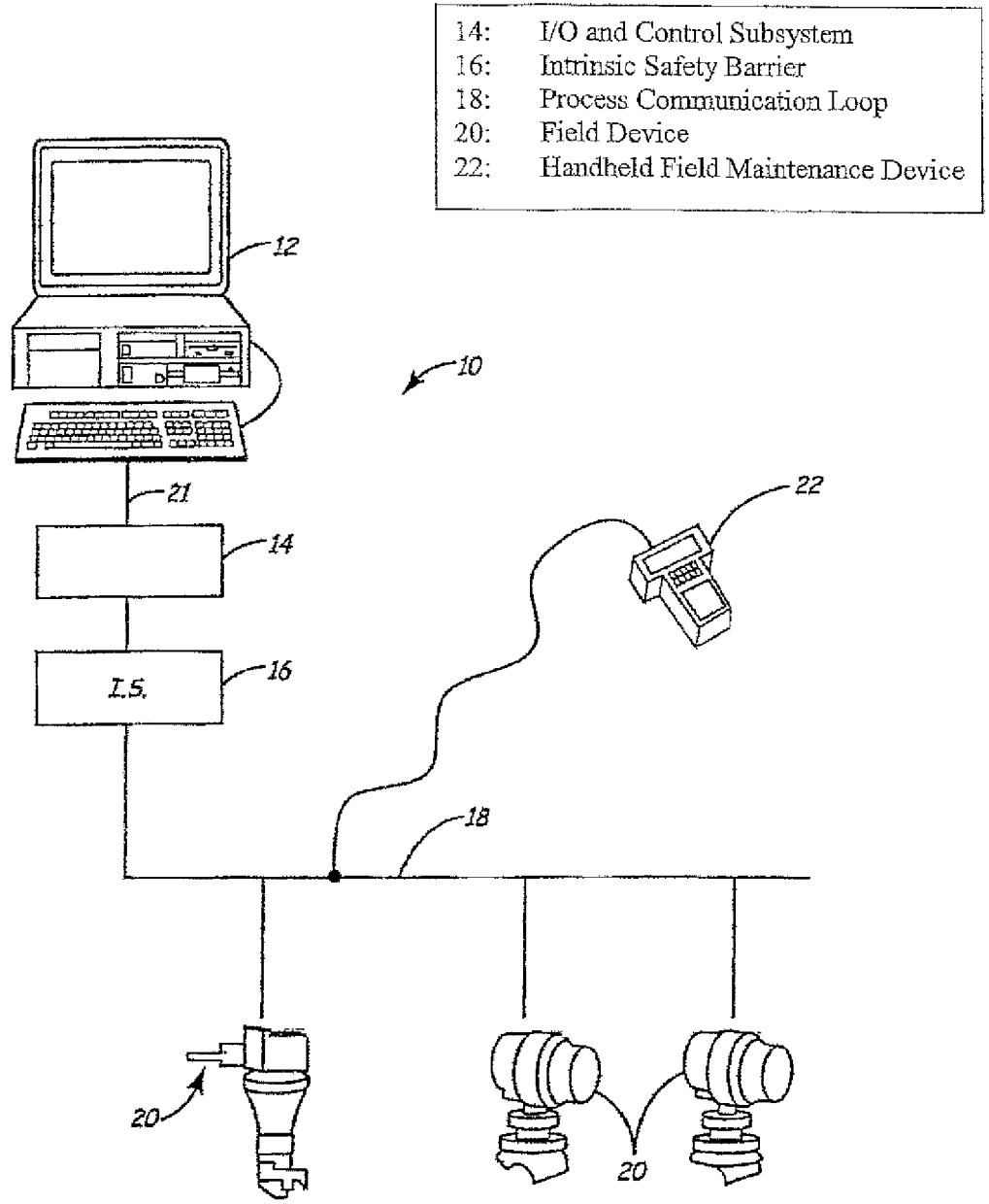
FIG. 1 is a diagrammatic view of a multi-drop process communication system environment in which embodiments of the present invention are particularly useful.

FIG. 1 illustrates an exemplary system in which embodiments of the present invention are particularly useful. System 10 includes controller 12, I/O and control sub-system 14, intrinsic safety (IS) barrier 16, process communication loop 18 and field devices 20. Controller 12 is coupled to I/O and control sub-system 14 via link 21 which can be any suitable link such as a local area network (LAN) operating in accordance with Ethernet signaling protocols or any other suitable protocol. I/O and control sub-system 14 is coupled to intrinsic safety barrier 16 which in turn is coupled to process communication loop 18 to allow data communication between loop 18 and I/O and control sub-system 14 in a manner that limits energy passing therethrough.

In this illustration, process communication or process control loop 18 is a FOUNDATION™ fieldbus process communication loop and is coupled to field devices 20, which are shown coupled arranged in a multi-drop configuration. An alternative process communication loop (not shown) is an HART® process communication loop. FIG. 1 illustrates a multi-drop wiring configuration that vastly simplifies system wiring compared to other topologies such as the star topology. Multi-drop HART® configurations support a maximum of 15 devices, while multi-drop FOUNDATION™ Fieldbus configurations support a maximum of 32 devices.

Figure 2A:
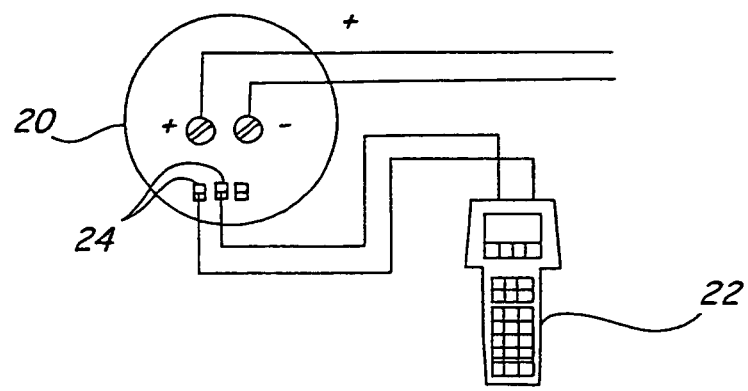
FIGS. 2A and 2B illustrate ways in which an intrinsically safe handheld field bus monitor may be connected to a field device.
Figure 2B:
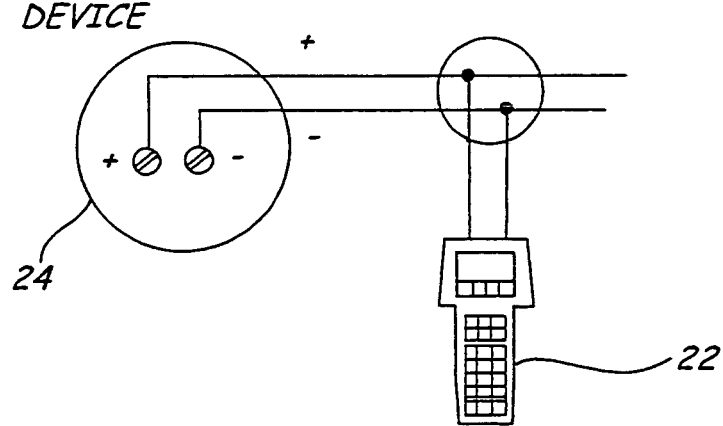

Intrinsically safe handheld field maintenance device 22 is coupled to loop 18 as illustrated in FIG. 1. When coupled to a process control loop as shown, device 22 can perform a number of communication and diagnostic functions. FIG. 2A illustrates device 22 coupled to HART®-compatible device 20 via terminals 24. Alternately, device 22 can communicate with a HART® compatible device on the process instrumentation communication loop, such as device 24 via the loop itself, as indicated in FIG. 2B.

Figure 3:
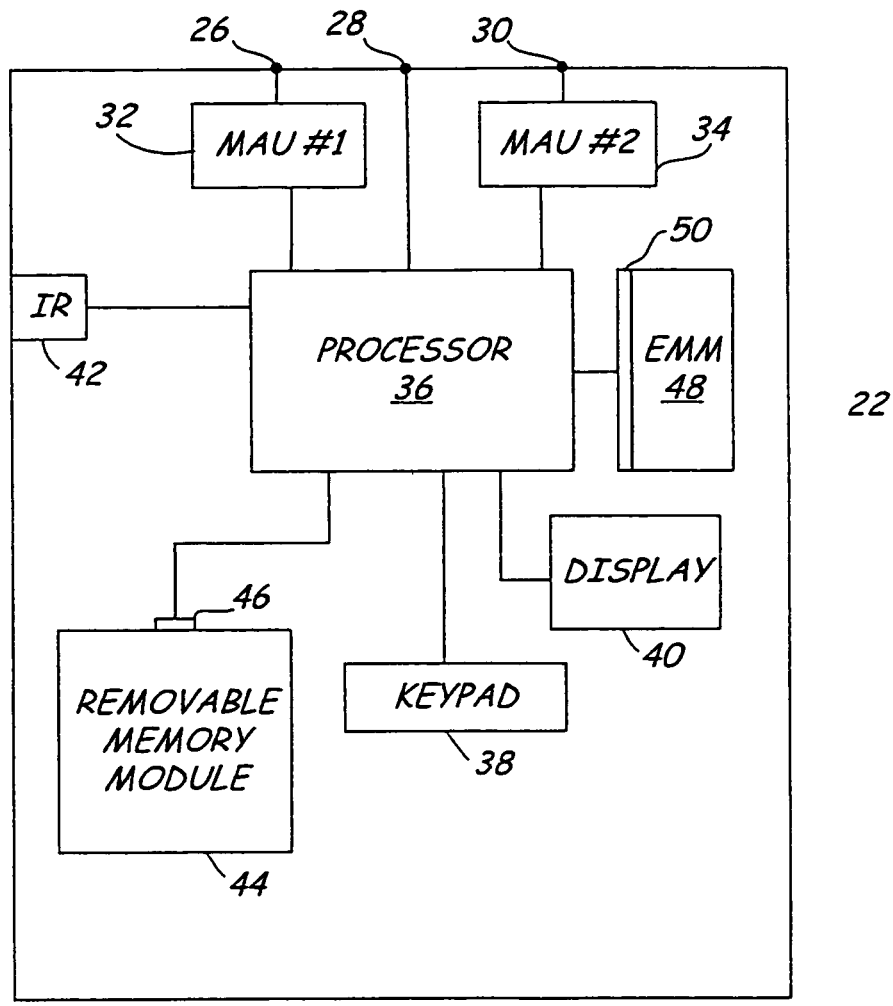
FIG. 3 is a diagrammatic view of handheld field maintenance bus monitor.

FIG. 3 is a diagrammatic view of handheld field maintenance device 22. Device 22 can be adapted, through hardware, software, or a combination thereof, to function as a bus monitor in accordance with embodiments of the present invention. As illustrated, device 22 preferably includes three communication terminals 26, 28 and 30 which facilitate coupling device 22 to process communication loops and/or devices in accordance with at least two process industry standard protocols. For example, when device 22 is to be coupled to a loop of a first process industry standard protocol, such coupling is effected using terminal 26 and common terminal 28. Accordingly, the connection then is made via media access unit 32 which is configured to interact upon the process communication loop in accordance with the first industry standard protocol. Additionally, when device 22 is to be coupled to a process and control measurement loop that operates in accordance with a second industry standard protocol, such connection is made via common terminal 28 and terminal 30. Thus, such a connection is effected via the second media access unit 34 which is configured to interact upon the process communication loop in accordance with the second industry standard protocol. Both media access units 32 and 34 are coupled to processor 36 which receives data from one of the media access units and interprets that data accordingly.

Processor 36 is also coupled to keypad module 38 and display module 40. Keypad module 38 is coupled to the keypad on the housing of device 22 in order to receive various keypad inputs from a user. Display module 40 is coupled to a display to provide data and/or a user interface.

Device 22 preferably includes infrared data access port 42, removable memory module 44 and expansion memory module 48. Infrared data access port 42 is coupled to processor 36 to allow device 22 to transfer information to and from a separate device using infrared wireless communication. One advantageous use of port 42 is transferring data captured by device 22 when used as a bus monitor, which use will be described in greater detail below. Another advantageous use of port 42 is for transferring and/or updating Device Descriptions stored in one or more memories of tool 22. A Device Description (DD) is a software technology used to describe parameters in a field device in a computer-readable format. This contains all of the information necessary for a software application being executed on processor 36 to retrieve and use the parametric data. The separate device such as computer 12, can obtain a new Device Description from floppy disk, CD ROM, or the internet and wirelessly transfer the new Device Description to tool 22.

In one embodiment, removable memory module 44 is removably coupled to processor 36 via port/interface 46. Removable memory module 44 is adapted to store any suitable data including captured digital communications, and/or software applications that can be executed instead of primary applications on processor 36. For example, module 44 may contain applications that use the HART® or FOUNDATION™ fieldbus communication port, to provide a comprehensive diagnostic for a given process valve. Additionally, module 44 may store software applications that aid in the calibration or configuration of specific devices. Module 44 may also store a software image for a new or updated primary device application that can subsequently be transferred into the non-volatile memory of device 36 to enable execution of the updated application. Further still, module 44 provides removable memory storage for the configuration of multiple devices allowing a field maintenance operator to acquire a relatively substantial amount of device data and conveniently store or transfer such data by simply removing module 44.

Preferably, module 44 is adapted to be replaceable in hazardous areas in a process plant. Thus, it is preferred that module 44 comply with intrinsic safety requirements set forth in: APPROVAL STANDARD INTRINSICALLY SAFE APPARATUS AND ASSOCIATED APPARATUS FOR USE IN CLASS I, II AND III, DIVISION 1 HAZARDOUS (CLASSIFIED) LOCATIONS, CLASS NUMBER 3610, promulgated by Factory Mutual Research October, 1988. Adaptations to comply with additional industrial standards such as Canadian Standards Association (CSA) and the European CENELEC standards are also contemplated. Examples of specific structural adaptations for memory module 44 and/or interface 46 to facilitate compliance include energy limiting circuits such that the operating voltage level of memory module 44 is sufficiently low that stored energy within module 44 cannot generate a source of ignition. Additionally, module 44 may include current limiting circuitry to ensure that in the event that specific terminals on module 44 are shorted, that the discharge energy is sufficiently low that ignition is inhibited. Finally, interface 46 may include physical characteristics that are specifically designed to prevent exposure of electrical contacts on memory module 44 to an external environment while simultaneously allowing suitable interface contacts to make electrical contact with module 44. For example, module 44 may include an over-modeling that can be pierced or otherwise displaced by coupling module 44 to interface 46.

Device 22 also preferably includes expansion memory module 48 coupled to processor 36 via connector 50 which is preferably disposed on the main board of device 22. Module 48 may include a software application that, when executed by device 22, causes device 22 to function as a handheld field maintenance bus monitor in accordance with an embodiment of the present invention. Expansion memory module 48 may also contain Device Descriptions of first and second industry standard protocols. Module 48 may also contain license code(s) that will determine the functionality of device 22 with respect to the multiple protocols. For example, data residing within module 48 may indicate that tool device is only authorized to operate within a single process industry standard mode, such as the HART® protocol. Ultimately, a different setting of that data within module 48 may indicate that device 22 is authorized to operate in accordance with two or more industry standard protocols. Module 48 is preferably inserted to a connector 50 on the main board and may in fact require partial disassembly of device 22, such as removing the battery pack to access port 50.

Figure 4:
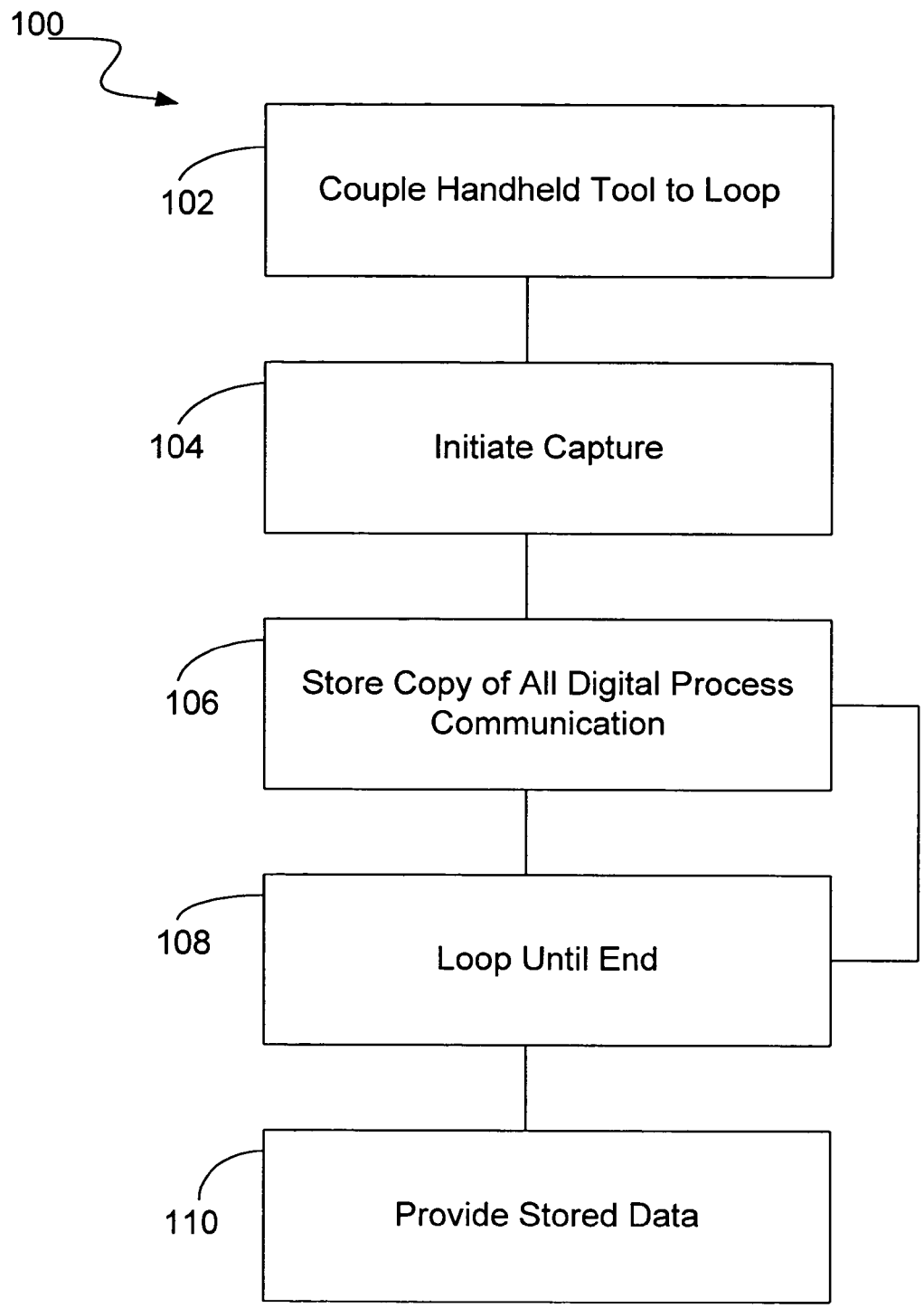
FIG. 4 is a flow diagram of a method for monitoring a process communication loop using a handheld field maintenance bus monitor in accordance with an embodiment of the present invention.

FIG. 4 is a flow diagram of method 100 for capturing and providing data on a process communication loop using a handheld field maintenance bus monitor. Method 100 begins at block 102 where a technician or operator physically couples the handheld field bus monitor to the process commination loop. Such coupling may be effected in either manner described above with respect to FIGS. 2A and 2B. Once the handheld field maintenance bus monitor has been so coupled, block 104 is executed. Block 104 can be executed in response to a technician pressing a button or generating some other suitable operator input to manually start the capture period. Moreover, the technician may also set a process communication condition, such as a communication originating from a particular field device, as the trigger for the beginning of the capture period. Once capture has been initiated at block 104, the handheld field maintenance bus monitor stores all digital communication occurring on the process control loop to which the handheld field bus monitor is connected. This storage of copies of all digital communication occurs at block 106 and continues until a suitable end condition for the capture period is detected, as indicated at block 108. The ending condition may be the receipt of another suitable operator input, such as an operator pressing an end or stop button, or it may be the occurrence of another process communication condition. At block 110, the stored communication data is provided by the handheld field maintenance bus monitor. The manner in which such data is provided can vary substantially and will be illustrated in greater detail with respect to FIG. 5.

Figure 5:
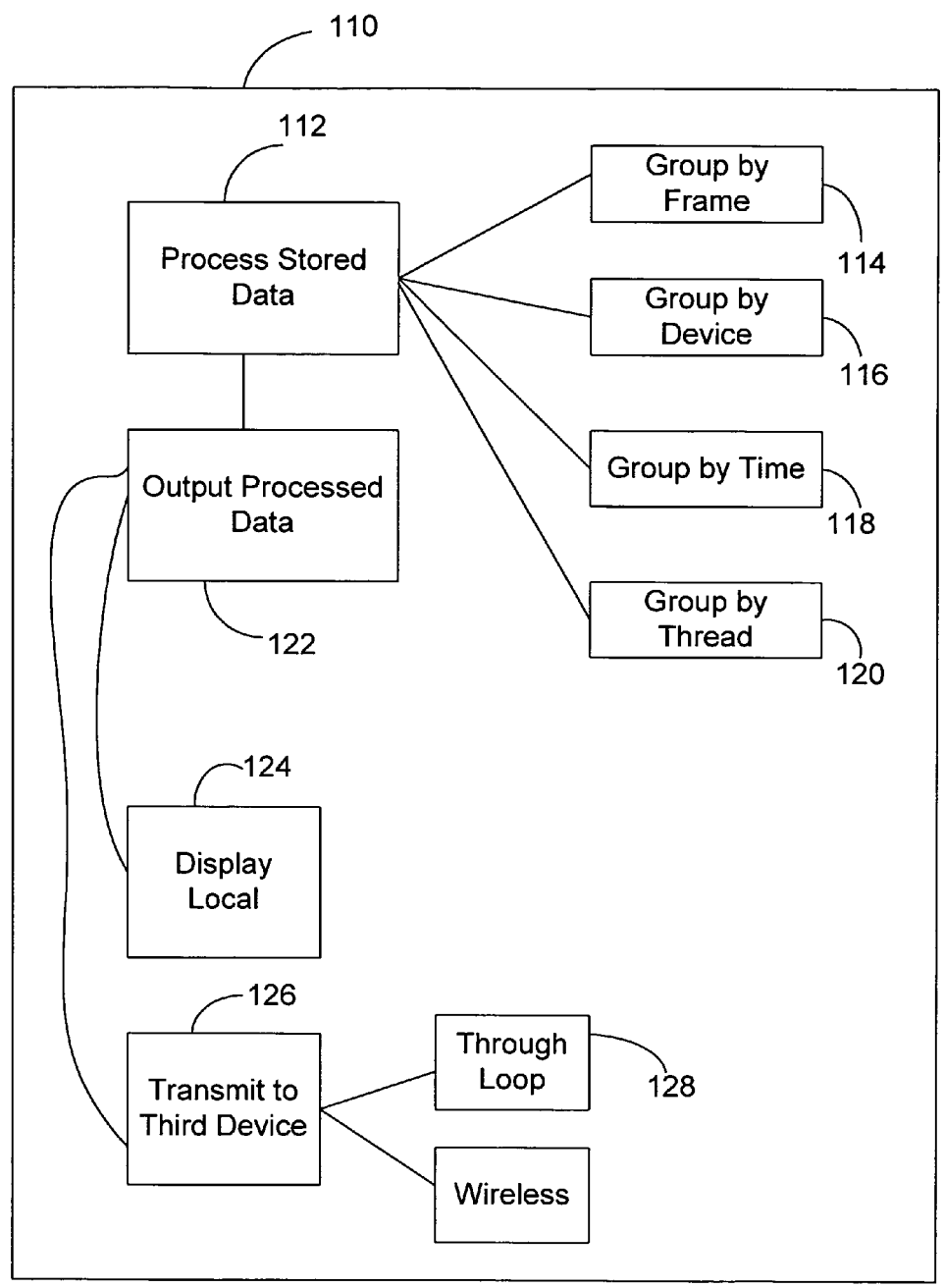
FIG. 5 is a flow diagram of a method for analyzing and/or providing data relative to the captured communication in accordance with an embodiment of the present invention.

FIG. 5 is a more detailed diagram of block 110 of FIG. 4. Block 110 generically refers to the provision of stored process communication data by the handheld field maintenance bus monitor. As indicated in FIG. 5, the handheld field maintenance bus monitor can process the stored data as indicated at block 112. Processing stored data can include any suitable data transformation or grouping as may be desired. For example, the communication data may be grouped according to the fieldbus frame within which it was observed, as indicated at block 114. Additionally, the communication data may be grouped according to the fieldbus device to which it was directed, or from which it originated, as indicated at block 116. Further still, the communication data may be grouped according to time or arranged chronologically, as indicated at block 118. Further still, the process communication data may be grouped according to communication threads, such that a conversation between two or more field devices is linked together, as indicated at block 120. Once the stored communication data is processed as set forth with respect to block 112, the processed data can be output as indicated at block 122. The output of the processed communication data can also vary significantly. For example, the output may simply be provided to the operator via a display on the handheld field maintenance bus monitor, as indicated at block 124. However, the processed data may also be transmitted, or otherwise communicated, to a third device, such as a controller, as indicated at block 126. Such communication can be effected in any suitable manner, including transmitted through the process communication loop, as indicated at block 128 or sent via wireless communication methods, such as radio frequency communication, infrared communication, GPRS communication, GSM communication, Wi-Fi communication, and/or Bluetooth communication.

Although the present invention has been described with reference to preferred embodiments, workers skilled in the art will recognize that changes may be made in form and detail without departing from the spirit and scope of the invention.

What is claimed is:

1. A handheld field maintenance bus monitor comprising:
   a plurality of terminals coupleable to a process communication loop;
   at least one media access unit coupled to the plurality of terminals and configured to receive digital process communication data from the process communication loop in accordance with an industry standard protocol;
   a controller coupled to the at least one media access unit and configured to receive the digital process communication data from the at least one media access unit;
   memory coupled to the controller to store the digital process communication data received from the at least one media access unit;
   a user interface configured to allow a user to define a condition configured to trigger a capture period;
   wherein, upon the occurrence of the condition, the handheld field maintenance bus monitor stores all digital process communication data occurring on the process communication loop in the memory during the capture period and groups the digital process communication data according to time.

2. The handheld field maintenance bus monitor of claim 1, and further comprising a display module configured to display the data.

3. The field maintenance bus monitor of claim 1, and further comprising a wireless data access port operably coupled to the controller and configured to provide the data.

4. The handheld field maintenance bus monitor of claim 1, wherein the controller is configured to process the data.

5. The handheld field maintenance bus monitor of claim 1, wherein the at least one media access unit comprises a plurality of media access units, each configured to communicate in accordance with a different process communication standard protocol.

6. The handheld field maintenance bus monitor of claim 5, wherein one of the plurality of media access units is configured to communicate in accordance with a Highway Addressable Remote Transducer (HART) protocol.

7. The handheld field maintenance bus monitor of claim 6, wherein another of the plurality of media access units is configured to communicate in accordance with a FOUNDATION Fieldbus protocol.

8. The handheld field maintenance bus monitor of claim 1, and further comprising a memory module having software embodied thereon, which software, when executed by the controller, causes the handheld field maintenance bus monitor to provide bus monitoring functions.

9. The handheld field maintenance bus monitor of claim 8, wherein the memory module is an expansion memory module coupled to a main board of the handheld field maintenance bus monitor.

10. The handheld field maintenance bus monitor of claim 1, wherein the memory includes a removable memory module.

11. The handheld field maintenance bus monitor of claim 1, wherein the user interface includes at least one button to start the capture period.

12. A method of capturing digital information on a process communication loop, the method comprising:
   setting a capture start condition and a capture end condition;
   coupling a handheld field maintenance bus monitor to the process communication loop;
   detecting satisfaction of the capture start condition;
   capturing and storing all digital communication information observed on the process communication loop in the handheld field maintenance bus monitor until the capture end condition is detected;
   arranging the digital communication information according to time; and
   providing the stored digital communication information.

13. The method of claim 12, and further comprising processing the stored digital communication information with the handheld field maintenance bus monitor.

14. The method of claim 12, wherein the providing the stored digital communication information includes displaying the stored digital communication information on the handheld field maintenance bus monitor.

15. The method of claim 12, wherein the providing the stored digital communication information includes transmitting the stored digital communication information through a wireless data access port.

16. The method of claim 12, wherein the providing the stored digital communication information includes transmitting the stored digital communication information over the process communication loop.

* * * * *